US012300419B2

(12) United States Patent
Radu et al.

(10) Patent No.: US 12,300,419 B2
(45) Date of Patent: May 13, 2025

(54) SPLIT WINDING ASSEMBLY FOR A TRANSFORMER

(71) Applicant: Hitachi Energy Ltd, Zurich (CH)

(72) Inventors: Ion Radu, Raleigh, NC (US); Parag Upadhyay, Morrisville, NC (US); Alberto Prieto, Cordova (ES)

(73) Assignee: Hitachi Energy Ltd, Zürich (CH)

( * ) Notice: Subject to any disclaimer, the term of this patent is extended or adjusted under 35 U.S.C. 154(b) by 546 days.

(21) Appl. No.: 17/488,577

(22) Filed: Sep. 29, 2021

(65) Prior Publication Data

US 2022/0102058 A1 Mar. 31, 2022

(30) Foreign Application Priority Data

Sep. 30, 2020 (EP) ..................................... 20382863

(51) Int. Cl.
*H01F 27/28* (2006.01)
*H01F 41/063* (2016.01)

(52) U.S. Cl.
CPC ..... *H01F 27/2828* (2013.01); *H01F 27/2876* (2013.01); *H01F 41/063* (2016.01)

(58) Field of Classification Search
CPC ............. H01F 27/2828; H01F 27/2876; H01F 41/063; H01F 27/24; H01F 27/28;
(Continued)

(56) References Cited

U.S. PATENT DOCUMENTS 5,296,829 A * 3/1994 Kothmann .............. H01F 27/10 336/185
5,444,426 A 8/1995 Sokai
(Continued)

FOREIGN PATENT DOCUMENTS

CN 1093487 A 10/1994
CN 103151153 A 6/2013
(Continued)

OTHER PUBLICATIONS

Result of Consultation for EP Patent Application No. 20382863.7, mailed Sep. 4, 2023, 5 pages.
(Continued)

*Primary Examiner* — Tuyen T Nguyen
(74) *Attorney, Agent, or Firm* — Sage Patent Group

(57) ABSTRACT

A split winding assembly for a transformer is configured to extend along a main limb of a transformer core between a first end and a second end. The split winding assembly includes a first split winding section extending from the first end toward a midpoint of the split winding assembly and a second split winding section extending from the second end toward the midpoint of the split winding assembly along the main limb of a transformer core. The first split winding section includes a first inner winding section configured to surround the main limb of the transformer core and a first outer winding section surrounding the first inner winding section. The second split winding section includes a second inner winding section configured to surround the main limb of the transformer core and a second outer winding section surrounding the second inner winding section.

20 Claims, 8 Drawing Sheets

(58) Field of Classification Search
CPC ........ H01F 27/29; H01F 27/324; H01F 41/06; H01F 27/08; H01F 30/06
See application file for complete search history.

(56) References Cited

U.S. PATENT DOCUMENTS

| | | | | |
|---|---|---|---|---|
| 8,085,121 | B2 * | 12/2011 | Hanov | H01F 27/36 336/84 C |
| 2010/0162557 | A1 | 7/2010 | Pauley, Jr. et al. | |
| 2011/0187485 | A1 | 8/2011 | Toyoda et al. | |
| 2018/0308632 | A1 | 10/2018 | Prieto et al. | |

FOREIGN PATENT DOCUMENTS

| | | | | |
|---|---|---|---|---|
| CN | 203338917 | U | 12/2013 | |
| CN | 105719799 | A | 6/2016 | |
| CN | 207743029 | U | 8/2018 | |
| CN | 108735476 | A | 11/2018 | |
| DE | 19809572 | C2 * | 6/2000 | H01F 27/29 |
| GB | 167916 | A | 8/1921 | |
| IN | 103093935 | A | 5/2013 | |
| JP | S5361019 | A | 6/1978 | |
| WO | WO-2011061207 | A1 * | 5/2011 | H01F 27/085 |

OTHER PUBLICATIONS

Extended European Search Report dated Mar. 16, 2021 for European Patent Application No. 20382863.7, 15 pages.
Ayers, R.E. et al., “Dynamic Measurements During Short-Circuit Testing of Transformers Part I: Instrumentation and Testing,” IEEE Transactions on Power Apparatus and Systems, vol. 82, No. 4, Jul. 1, 1974, 9 pages.
Chinese Office Action and English Summary for Chinese Invention Patent Application No. 2021110371794, mailed Aug. 31, 2023, 11 pages.
Chinese Search Report, Chinese Invention Patent Application No. 2021110371794, mailed Aug. 29, 2023, 3 pages.

* cited by examiner

SPLIT WINDING ASSEMBLY FOR A TRANSFORMER

CROSS-REFERENCE TO RELATED APPLICATIONS

The present application claims benefit of priority to European Patent Application No. 20382863.7, filed Sep. 30, 2020, and is assigned to the same assignee as the present application and is incorporated herein by reference.

BACKGROUND

The present disclosure relates to electrical transformers, and particularly to split winding assemblies for electrical transformers for use in transmission and distribution of electrical energy in different environments.

Conventional electrical power transmission and distribution systems employ transformers that raise or lower voltages within the power transmission and distribution system. However, different countries use different primary and secondary voltages, which results in different voltage ratios. As a result, many transformers are configured to set multiple voltage ratios. However, conventional multi-voltage ratio transformers have a number of disadvantages, such as current imbalances, load losses, short circuit forces, and other drawbacks. Thus, there is a need for a multi voltage ratio transformer for a power distribution system that reduces or eliminates these problems.

SUMMARY

According to some embodiments, a split winding assembly for a transformer is configured to extend along a main limb of a transformer core between a first end and a second end. The split winding assembly includes a first split winding section extending from the first end toward a midpoint of the split winding assembly along the main limb of a transformer core. The first split winding section includes a first inner winding section configured to surround the main limb of the transformer core and a first outer winding section surrounding the first inner winding section. The first inner winding section is electrically connected to the first outer winding section proximate to the midpoint of the split winding assembly. The split winding assembly further includes a second split winding section extending from the second end toward the midpoint of the split winding assembly. The second split winding section includes a second inner winding section configured to surround the main limb of the transformer core, and a second outer winding section surrounding the second inner winding section. The second inner winding section is electrically connected to the second outer winding section proximate to the midpoint of the split winding assembly. The first split winding section and the second split winding section are electrically insulated from each other.

According to some embodiments, the split winding assembly further includes a first pair of terminals electrically connected to the first inner winding section and the first outer winding section at the first end of the split winding assembly, and a second pair of terminals electrically connected to the second inner winding section and the second outer winding section at the second end of the split winding assembly.

According to some embodiments, the first end and the second end of the split winding assembly define a first axis.

The split winding assembly is bilaterally symmetrical with respect to an axis of symmetry that is perpendicular to the first axis.

According to some embodiments, the split winding assembly further includes a cooling subassembly surrounding the first split winding section and the second split winding section. The cooling subassembly includes a central duct extending between the first end and the second end of the split winding assembly. The central duct is configured to surround the main limb of the transformer core so that the transformer core extends through the central duct. The cooling subassembly includes a plurality of radial ducts extending radially between the central duct and an exterior of the cooling subassembly. The plurality of radial ducts are in fluid communication with the central duct and the exterior of the cooling subassembly.

According to some embodiments, the cooling subassembly further includes a plurality of axial ducts extending between the first end and the second end of the split winding assembly. Each axial duct is disposed between the first inner winding section and the first outer winding section of the first split winding section and between the second inner winding section and the second outer winding section of the second split winding section. Each axial duct of the plurality of axial ducts is in fluid communication with the first end of the split winding assembly, the second end of the split winding assembly, and at least one radial duct of the plurality of radial ducts.

According to some embodiments, each of the first inner winding section, the first outer winding section, the second inner winding section, and the second outer winding section includes one of a helical-type winding, a foil-type winding, a disc-type winding, or layer-type winding.

According to some embodiments, a transformer includes a transformer core comprising at least one main limb, and at least one split winding subassembly extending along the at least one main limb between a first end and a second end, each split winding assembly including a first split winding section extending from the first end toward a midpoint of the split winding subassembly along the at least one main limb. The first split winding section includes a first inner winding section surrounding the at least one main limb, and a first outer winding section surrounding the first inner winding section. The first inner winding section is electrically connected to the first outer winding section proximate to the midpoint of the split winding subassembly. The first split winding section further includes a first pair of terminals electrically connected to the first inner winding section and the first outer winding section at the first end of the split winding subassembly. The split winding assembly further includes a second split winding section extending from the second end toward the midpoint of the split winding subassembly. The second split winding section includes a second inner winding section surrounding the at least one main limb, and a second outer winding section surrounding the second inner winding section. The second inner winding section is electrically connected to the second outer winding section proximate to the midpoint of the split winding subassembly. The second split winding section further includes a second pair of terminals electrically connected to the second inner winding section and the second outer winding section at the second end of the split winding subassembly. The first split winding section and the second split winding section of each split winding subassembly are electrically insulated from each other. The first end and the second end of each split winding subassembly define a first axis. Each split winding subassembly is bilaterally symmetrical with respect to an axis of symmetry that is perpendicular to the first axis of the split winding subassembly.

According to some embodiments, the at least one split winding subassembly includes a plurality of split winding subassemblies electrically connected to each other in series.

According to some embodiments, the at least one split winding subassembly includes a plurality of split winding subassemblies electrically connected to each other in parallel.

According to some embodiments, each split winding subassembly further includes a cooling subassembly surrounding the first split winding section and the second split winding section of the split-wiring subassembly. The cooling subassembly includes a central duct extending between the first end and the second end of the split winding subassembly. The central duct is configured to surround the main limb of the transformer core so that the transformer core extends through the central duct. The cooling subassembly further includes a plurality of radial ducts extending radially between the central duct and an exterior of the cooling subassembly. The plurality of radial ducts are in fluid communication with the central duct and the exterior of the cooling subassembly.

According to some embodiments, the cooling subassembly of each split winding subassembly further includes a plurality of axial ducts extending between the first end and the second end of the split winding assembly. Each axial duct is disposed between the first inner winding section and the first outer winding section of the first split winding section and between the second inner winding section and the second outer winding section of the second split winding section. Each axial duct of the plurality of axial ducts is in fluid communication with the first end of the split winding assembly, the second end of the split winding assembly, and at least one radial duct of the plurality of radial ducts.

According to some embodiments, the transformer further includes a tank surrounding the core and the at least one split winding sub-assembly. The cooling subassembly of each split winding subassembly is configured to circulate a fluid through the radial ducts to cool the split winding subassembly.

According to some embodiments, the at least one split winding subassembly comprises a primary winding.

According to some embodiments, the at least one split winding subassembly further comprises a secondary winding disposed between the primary winding and the core.

According to some embodiments, the at least one split winding subassembly comprises a secondary winding.

According to some embodiments, the transformer further includes a primary winding that includes a first primary winding section surrounding the first split winding section. The first primary winding section includes a first tap area. The transformer further includes a second primary winding section surrounding the first split winding section. The second primary winding section includes at least one second tap area. The primary winding is bilaterally symmetrical with respect to the axis of symmetry.

According to some embodiments, the core includes a single-phase core.

According to some embodiments, the single-phase core comprises one of a D core, an EY core, or a DY core.

According to some embodiments, the core includes a three-phase core.

According to some embodiments, the three-phase core comprises one of a T core or a TY core.

According to some embodiments, a method of forming a split winding section for a transformer includes forming a first split winding section. Forming the first split winding section includes winding a first conductive element around a first support structure from a first distal end toward a first midpoint end to form a first inner winding section. Forming the first split winding section further includes winding the first conductive element around the first inner winding section from the midpoint end toward the first distal end to form a first outer winding section. The first inner winding section is electrically connected to the first outer winding section proximate to the midpoint end. The method further includes forming a second split winding section. Forming the second split winding section includes winding a second conductive element around a second support structure from a second distal end toward a second midpoint end to form a second inner winding section. Forming the second split winding section further includes winding the second conductive element around the second inner winding section from the second midpoint end toward the second distal end to form a second outer winding section. The second inner winding section is electrically connected to the second outer winding section proximate to the second midpoint end. The method further includes disposing the first split winding section and the second split winding section around a main limb of a transformer core. The first midpoint end and the second midpoint end are proximate to each other. The first distal end and the second distal end extend away from each other along the main limb. The first split winding section and the second split winding section are electrically insulated from each other.

BRIEF DESCRIPTION OF THE DRAWINGS

The accompanying drawings, which are included to provide a further understanding of the disclosure and are incorporated in a constitute a part of this application, illustrate certain non-limiting embodiments. In the drawings:

FIG. 1B is a diagram illustrating top views of the split winding assembly 100 of FIG. 1A and alternative winding section shapes, according to some embodiments;

DETAILED DESCRIPTION

Embodiments will now be described more fully hereinafter with reference to the accompanying drawings. Embodiments may, however, be embodied in many different forms and should not be construed as limited to the embodiments set forth herein. Rather, these embodiments are provided so that this disclosure will be thorough and complete, and will fully convey the scope of present disclosure to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1A:
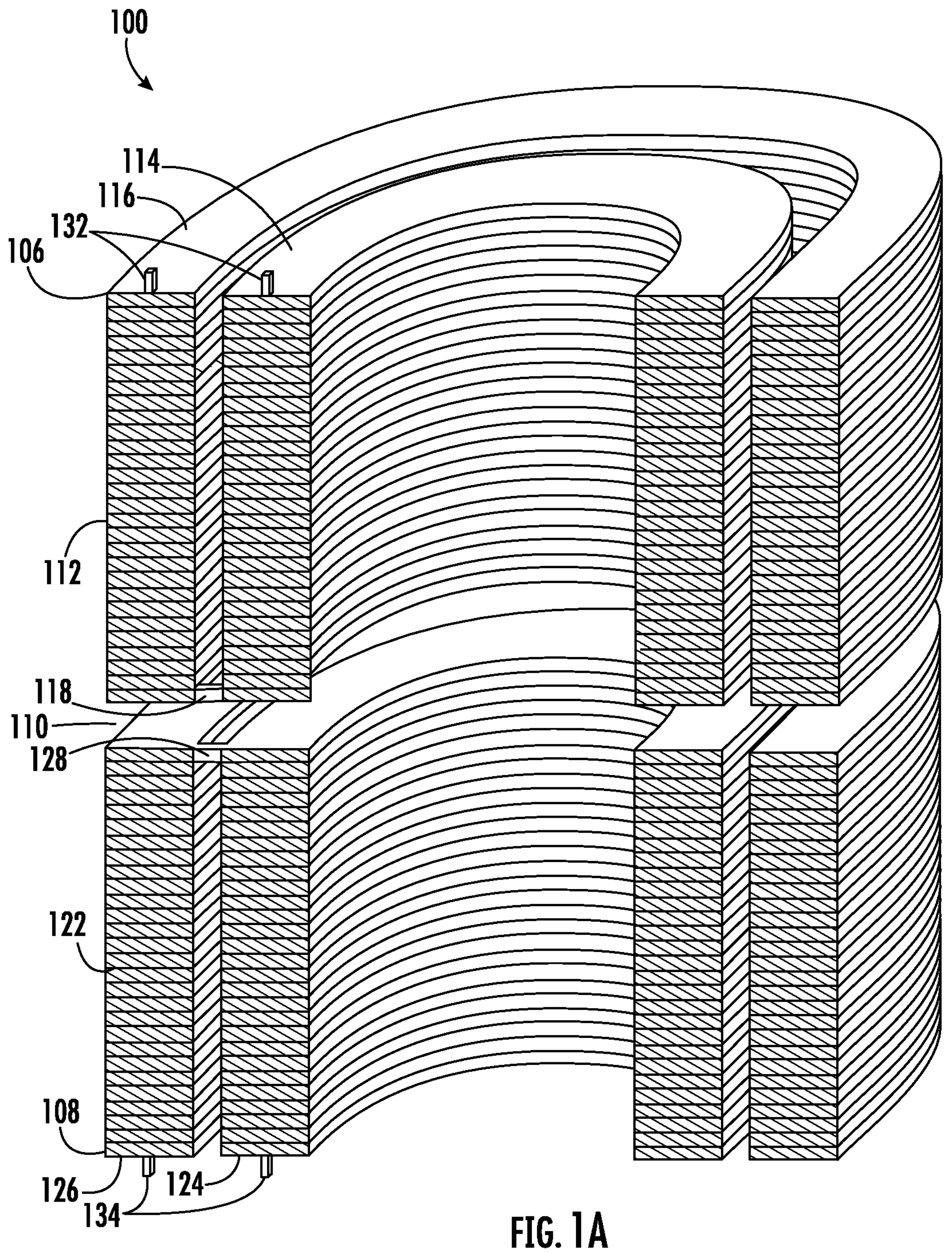
FIG. 1A is a diagram illustrating an isometric cutaway view of a split winding assembly for a transformer, according to some embodiments.

Referring now to FIG. 1A, an isometric cutaway view of a split winding assembly 100 for a transformer is illustrated, according to some embodiments. The split winding assembly 100 includes a first split winding section 112 extending from a first distal end 106 toward a midpoint 110 (e.g., gap) of the split winding assembly 100, and a symmetrical second split winding section 122 extending from a second distal end 108 toward the midpoint 110.

The first split winding section 112 includes a first inner winding section 114 configured to surround a main limb (which may also be referred to as a leg or core leg) of a transformer core and a first outer winding section 116 surrounding the first inner winding section 114. A first pair of axial terminals 132 are electrically connected to the first inner winding section 114 and the first outer winding section 116 at the first distal end 106 of the split winding assembly 100. The first inner winding section 114 is electrically connected to the first outer winding section 116 by a first electrical connection 118 that is located proximate to the midpoint 110 of the split winding assembly 100, which forms a "U-shaped" profile.

The second split winding section 122 includes a second inner winding section 124 configured to surround the main limb of the transformer core and a second outer winding section 126 surrounding the second inner winding section 124. A second pair of axial terminals 134 are electrically connected to the second inner winding section 124 and the second outer winding section 126 at the second distal end 108 of the split winding assembly 100. The second inner winding section 124 is electrically connected to the second outer winding section 126 by a second electrical connection 128 that is located proximate to the midpoint 110 of the split winding assembly 100, which forms another U-shaped profile that is symmetrical to the U-shaped profile of the first split winding section. As a result, the symmetrical U-shaped profiles of the first split winding section 112 and the second split winding section 122, which are electrically insulated from each other in this example, form an "H-shaped" profile for the split winding assembly 100.

This symmetrical H-shaped profile provides a number of benefits. For example, the first split winding section 112 and the symmetrical second split winding section 122 may have identical impedances, which causes currents to be equally distributed, which in turn reduces or eliminates current circulations and current imbalances in the transformer, thereby reducing overall load losses in the transformer. Temperature rise and load losses are also more evenly distributed across the symmetrical windings, with lower and more balanced short circuit forces. The H-shaped profile also results in a more rigid and robust structure, with reduced manufacturing and assembly complexity. Components and subcomponents may also be standardized, further reducing cost and complexity for the transformer.

Figure 1B:
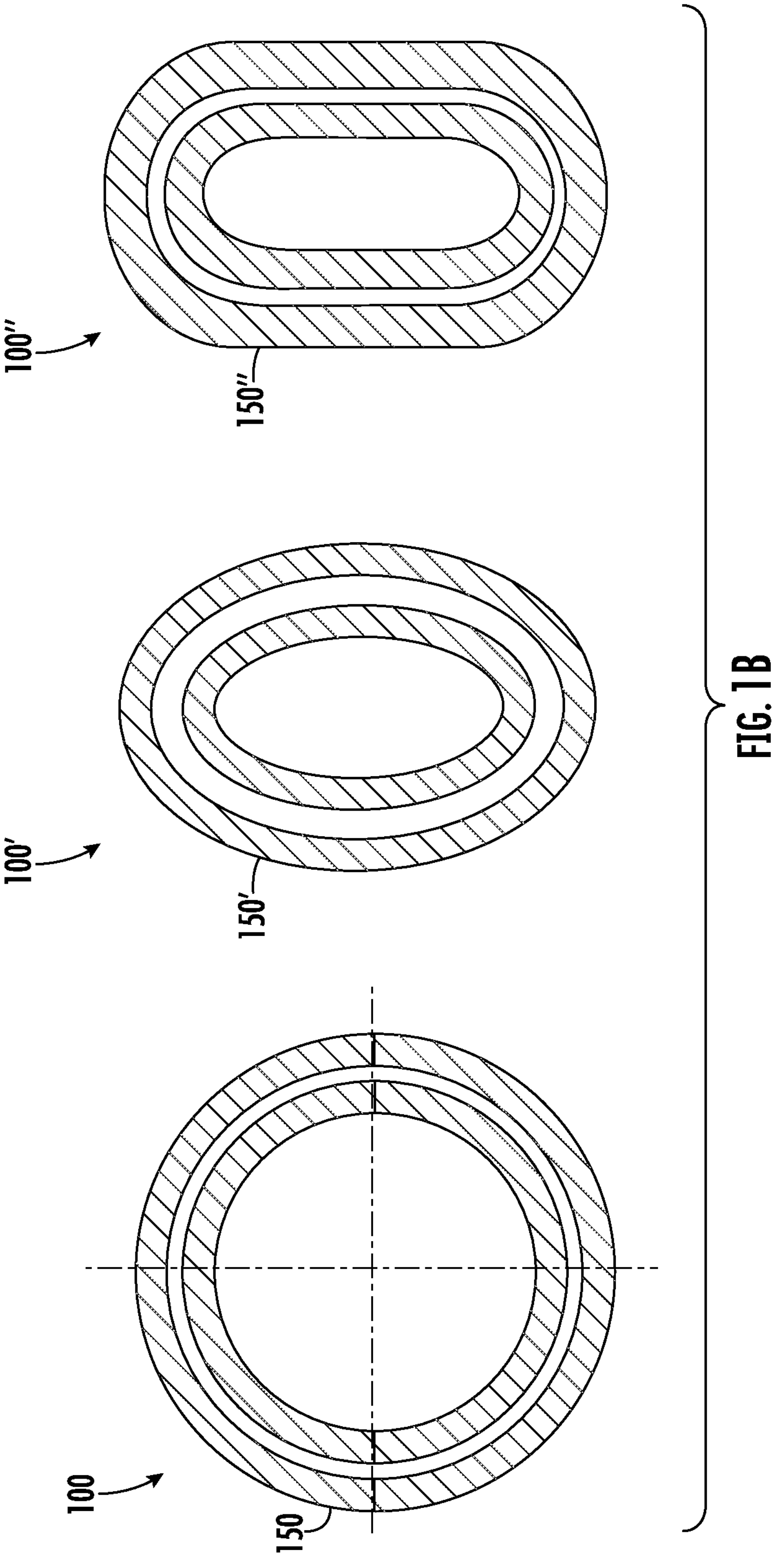
FIG. 1B is a diagram illustrating a top view of the split winding assembly of FIG. 1A
Figure 2:
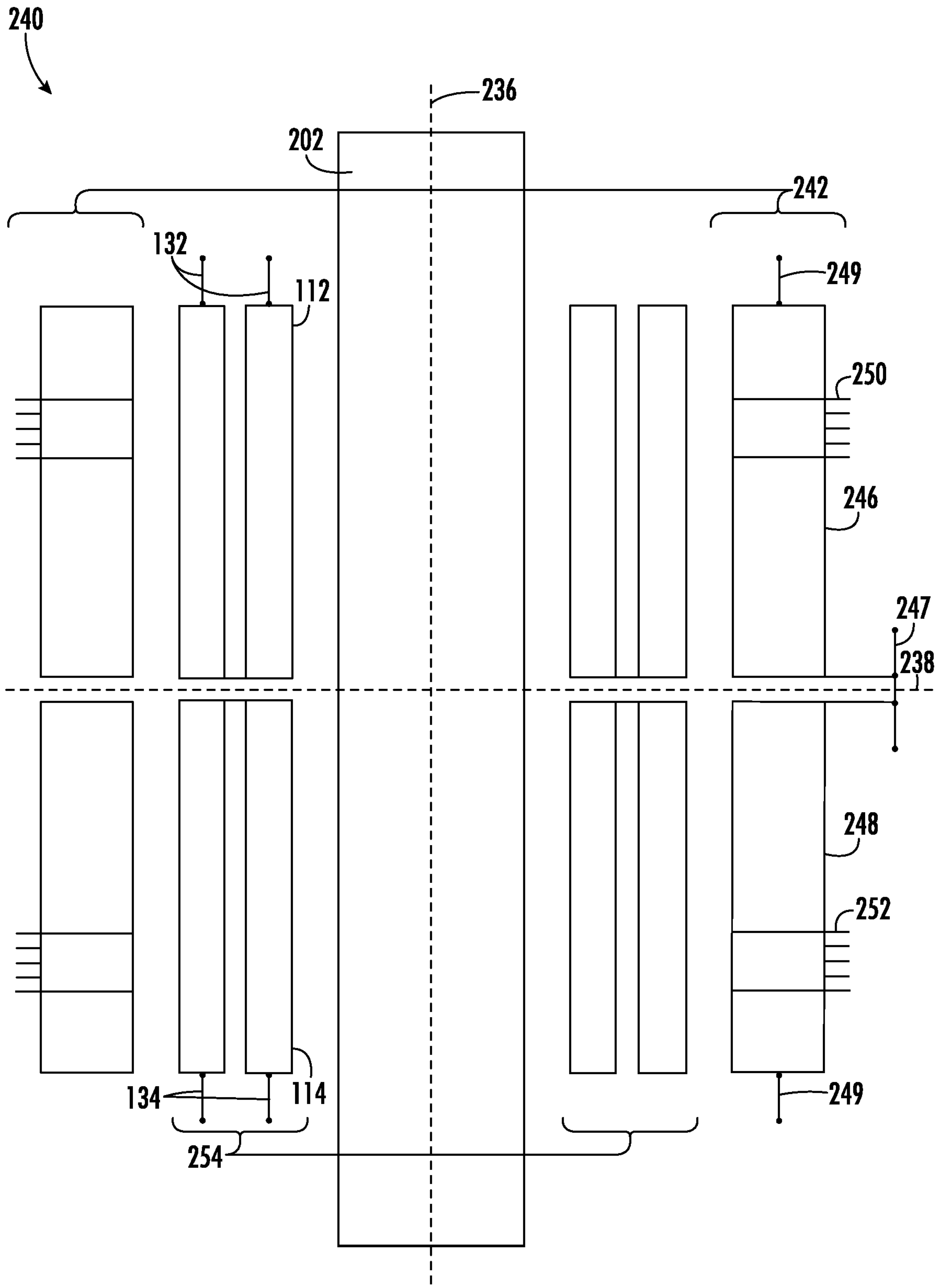
FIG. 2 is a cross-sectional winding diagram illustrating the split winding assembly arranged around a main limb of a transformer core to form a secondary winding for the transformer, according to some embodiments.

FIG. 1B is a diagram illustrating top views of the split winding assembly 100 of FIG. 1A and alternative winding section shapes. For example, the split winding assembly 100 has a circular shape 150, split winding assembly 100' has an oval shape 150', and split winding assembly 100" has a rounded rectangular shape 150". Referring now to FIG. 2, a cross-sectional view (e.g., winding diagram) of the split winding assembly 100 arranged around a main limb 202 of a transformer core 240 is illustrated. In this example, the first distal end 106 and the second distal end 108 define a first symmetry axis 236, and the split winding assembly 100 is bilaterally symmetrical with respect to an axis of symmetry 238 that is perpendicular to the first axis 236.

In the example of FIG. 2, the split winding assembly 100 forms a secondary winding 254 (e.g., a low voltage winding) for the transformer 240. A symmetrical primary winding 242 (e.g., a high voltage winding) is also provided around the secondary winding 254, including a first primary winding section 246 corresponding to the first split winding section 112 of the split winding assembly 100 and a second primary winding section 248 corresponding to the second split winding section 122 of the split winding assembly 100. In this example, the primary winding 242 is bilaterally symmetrical with respect to the same axis of symmetry 238 as the split winding assembly 100. In this example, the first primary winding section 246 optionally includes a first tap area 250 and the second primary winding section 248 includes a second tap area 252, for force balancing between and among the different winding sections and subcomponents.

In this example, the primary winding 242 is the outermost winding, which allows the first primary winding section 246 and the second primary winding section 248 to share a radial entry/exit terminal 247 proximate to the midpoint 110, with the opposite axial entry/exit terminals 249 at the respective first and second distal ends 106, 108. The H-shaped profile of the secondary winding 254, avoids the need for a radial entry/exit terminal by locating the entry/exit terminals 132, 134 for the first and second split winding sections 112, 122 at the respective first and second distal ends 106, 108, thereby allowing for easier and less complex access to all the entry/exit terminals 132, 134, 247, 249.

Figure 3B:
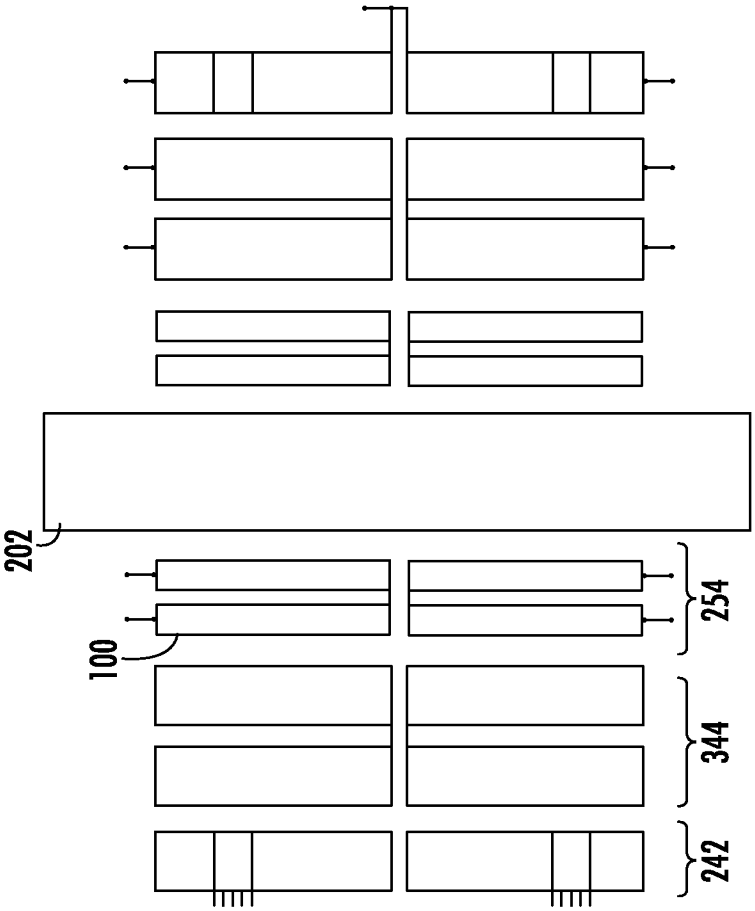
FIGS. 3A and 3B illustrate a plurality of split winding assemblies arranged around a transformer core to form a primary winding and a secondary winding for the transformer in different configurations, according to some embodiments.
Figure 3A:
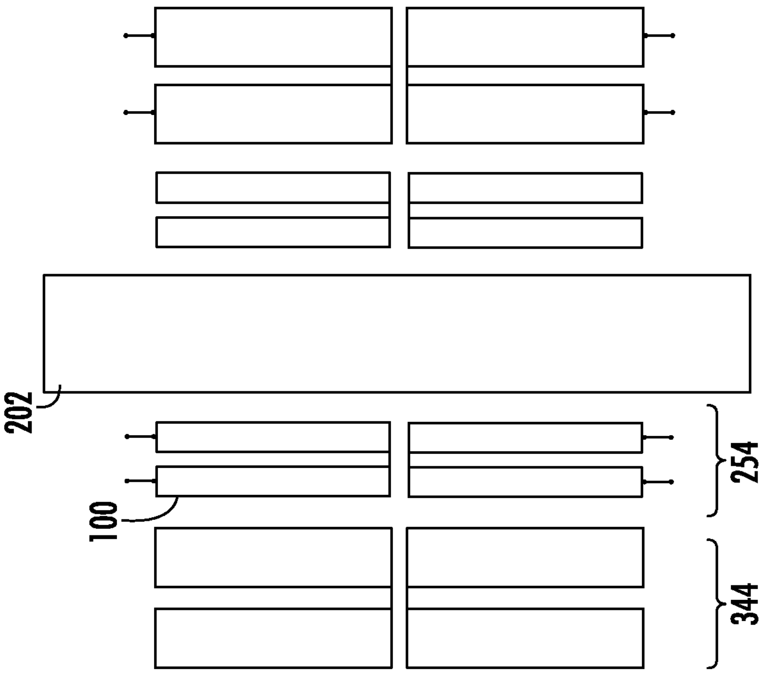

It should be understood that other configurations may be used in addition to or as alternatives to the configuration of FIG. 2. For example, FIG. 3A illustrates a plurality of split winding assemblies 100 arranged around a transformer core 202, including a primary split winding 344. FIG. 3B illustrates another example having a plurality of primary windings, including a primary split winding 344 and another primary winding 242 having a pair of symmetrical tap areas 250, 252. It should also be understood that a plurality of split winding assemblies 100 may be electrically connected to each other in series or in parallel, as desired. For example, by connecting multiple split winding assemblies 100 in series or in parallel, standardized components may be used to achieve any number of different voltage configurations and voltage ratios and power ratings without many of the drawbacks associated with conventional multi voltage ratio transformers.

Figure 4A:
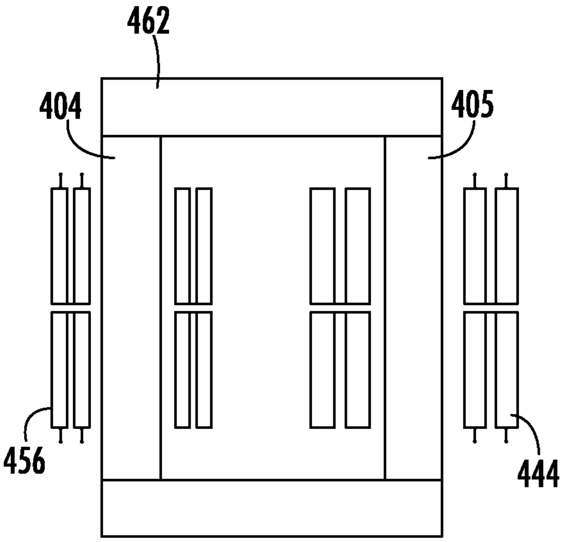
FIG. 4A-4C illustrate a plurality of configurations for using split winding assemblies as primary and/or secondary windings in a single-phase transformer, according to some embodiments.
Figure 4B:
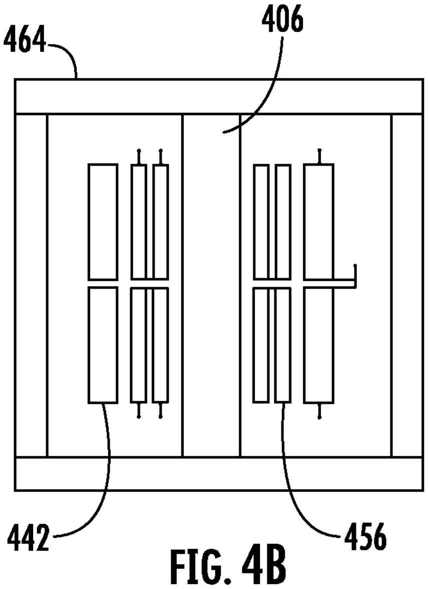
Figure 4C:
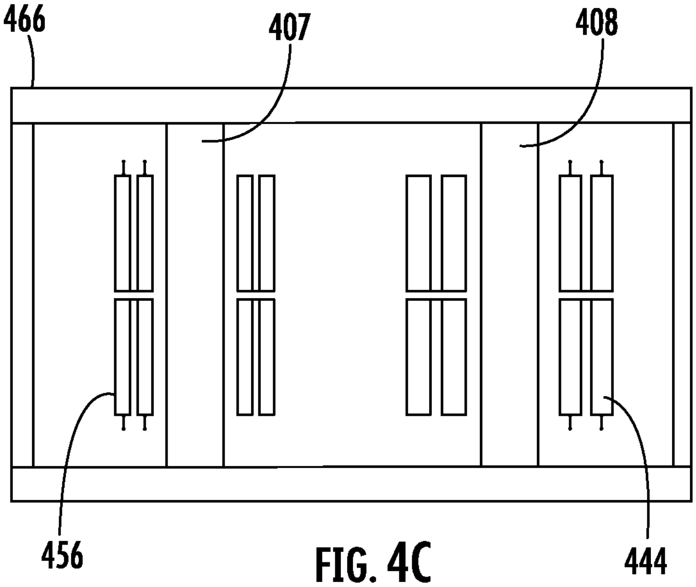

Split windings as disclosed herein may use a number of different winding types, including helical-type, foil-type, disc-type, and/or layer-type, for example, as desired. Split windings as disclosed herein may also be used in a variety of applications, including single phase and three-phase configurations. In this regard, FIG. 4A-4C illustrate a plurality of configurations for using split winding assemblies as primary and/or secondary windings in a single-phase transformer, according to some embodiments. FIG. 4A illustrates a single-phase D core 462 having two main limbs 404, 405. In this example the two main limbs 404, 405 of the core 462 accommodate a primary split winding 444 and a secondary split winding 456, respectively.

FIG. 4B illustrates a single-phase EY core 464 having one main limb 406 and two side limbs 407. In this example the main limb 406 of the core 464 accommodates a secondary split winding 456 surrounded by a primary winding 442.

FIG. 4C illustrates a single-phase DY core 466 having two main limbs 407, 408 and two side limbs 409, 410. In this example the main limbs 407, 408 of the core 466 accommodates a primary split winding 444 and a secondary split winding 456, respectively.

Figure 5A:
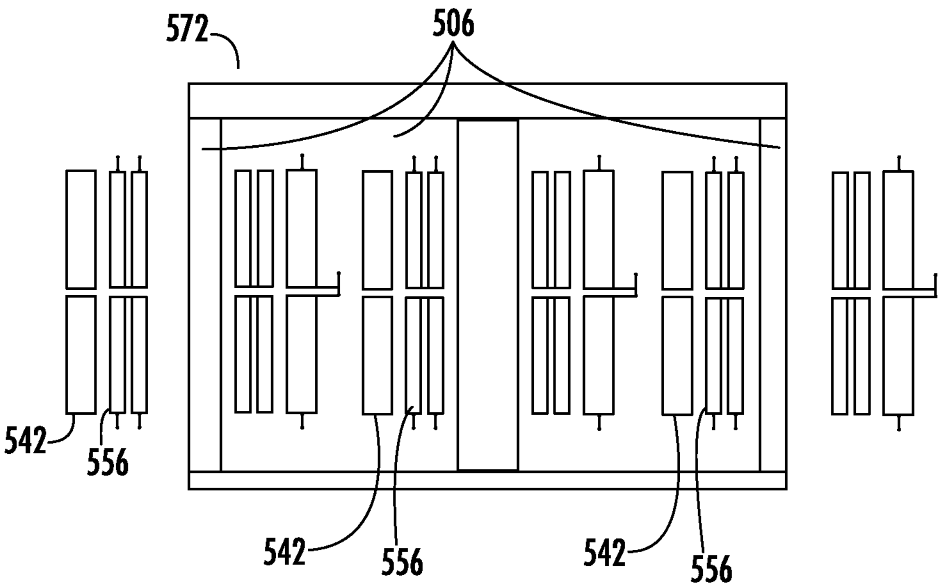
FIGS. 5A and 5B illustrate a plurality of configurations for using split winding assemblies as primary and/or secondary windings in a three-phase transformer, according to some embodiments.
Figure 5B:
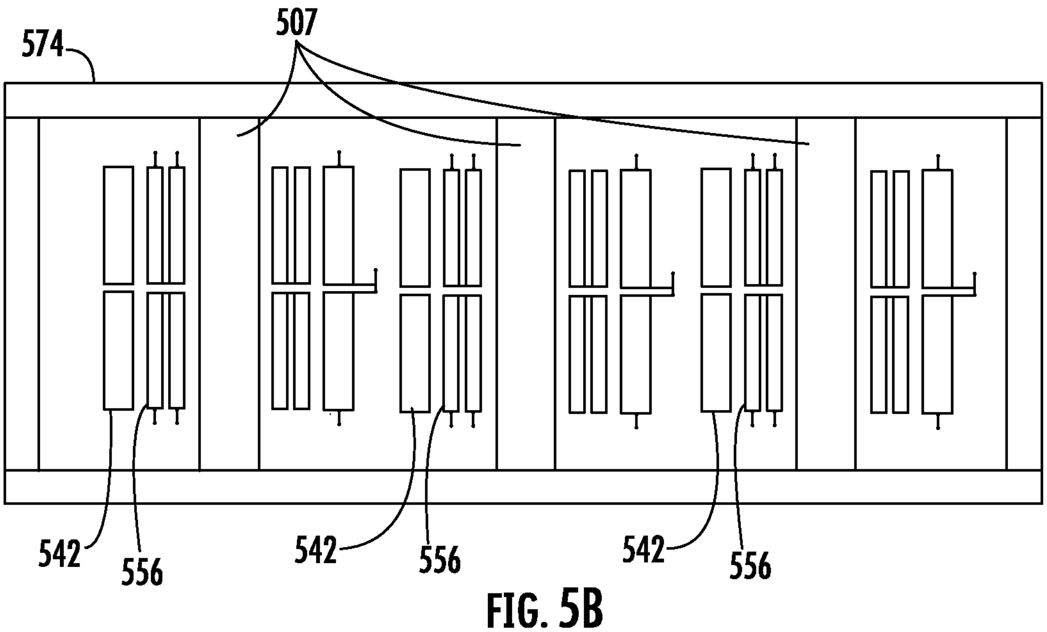

FIGS. 5A and 5B illustrate a plurality of configurations for using split winding assemblies 100 as primary and/or secondary windings in a three-phase transformer, according to some embodiments. In this regard, FIG. 5A illustrates a three-phase T core 572 having three main limbs 506. In this example, each of three main limbs 506 of the core 572 accommodates a secondary split winding 556 surrounded by a primary winding 542.

FIG. 5B illustrates a three-phase TY core 574 having three main limbs 507 and two side limbs 509. In this example, each of three main limbs 507 of the core 574 accommodates a secondary split winding 556 surrounded by a primary winding 542.

Thus, it should be understood that the split winding assembly 100 may be used in and provide technical benefits in a number of applications including, but not limited to, the configurations described herein.

Figure 6B:
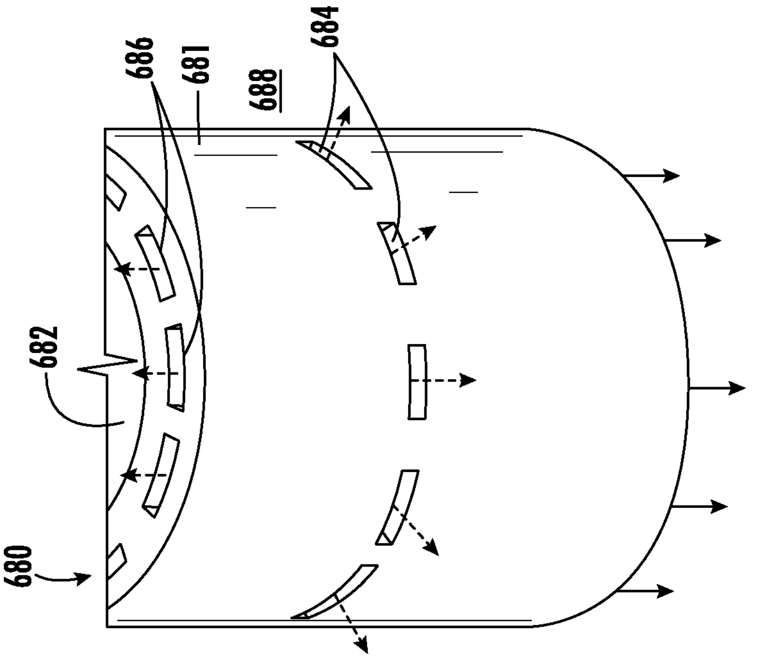
FIGS. 6A and 6B illustrate a cooling subassembly for a split winding assembly that includes radial ducts for cooling the split winding assembly.
Figure 6A:
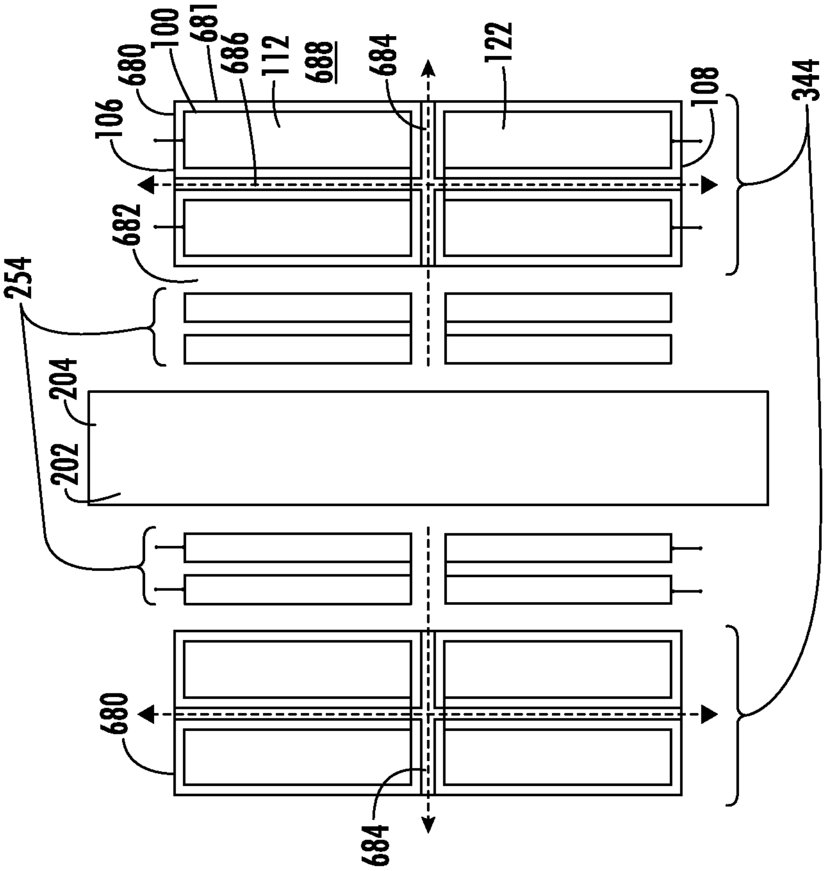

The split winding assembly 100 also allows for unique cooling configurations that provide more efficient cooling for the winding over conventional cooling arrangements. In this regard, FIGS. 6A and 6B illustrate a cooling subassembly 680 for a split winding assembly 100. A cooling material 681, which is heat conductive but not electrically conductive in this example, surrounds the first split winding section 112 and the second split winding section 122. A central duct 682 extends between the first distal end 106 and the second distal end 108 of the split winding assembly 100, and is configured to surround a main limb of a transformer core (e.g., transformer cores 463, 464, 466, 572, 574, etc.) so that the main limb of the transformer core extends through the central duct 682. A plurality of radial ducts 684 extend radially between the central duct 682 and an exterior 688 of the cooling subassembly 680 so that the radial ducts 684 are in fluid communication with the central duct 682 and the exterior 688 of the cooling subassembly 680.

In this example, a plurality of axial ducts 686 also extend between the first distal end 106 and the second distal end 108 of the split winding assembly 100 such that each axial duct 686 is disposed between the first inner winding section 114 and the first outer winding section 116 of the first split winding section 112 and between the second inner winding section 124 and the second outer winding section 126 of the second split winding section 122. In this example, each axial duct 686 is in fluid communication with the first distal end 106 of the split winding assembly 100, the second distal end 108 of the split winding assembly 100, and at least one radial duct 684. In this manner, the cooling subassembly 680 permits a fluid 692, such as air or oil within a tank 690 surrounding the transformer components for example, to circulate and transfer heat away from the split winding assembly 100 to prevent overheating, wear, and/or damage to the components of the transformer.

This cooling arrangement provides a number of advantages over conventional transformers, which typically provide limited or no access to cooling. By providing radial and axial circulation of oil, air, or other cooling fluids, winding hot spots may be minimized, and the symmetrical arrangement may also more evenly distribute load losses, for improved thermal performance.

In this example, the cooling subassembly 680 encloses the primary split winding 344 but it should be understood that similar cooling arrangements may be used with the secondary split winding 242 in addition or as an alternative, as desired.

Figure 7:
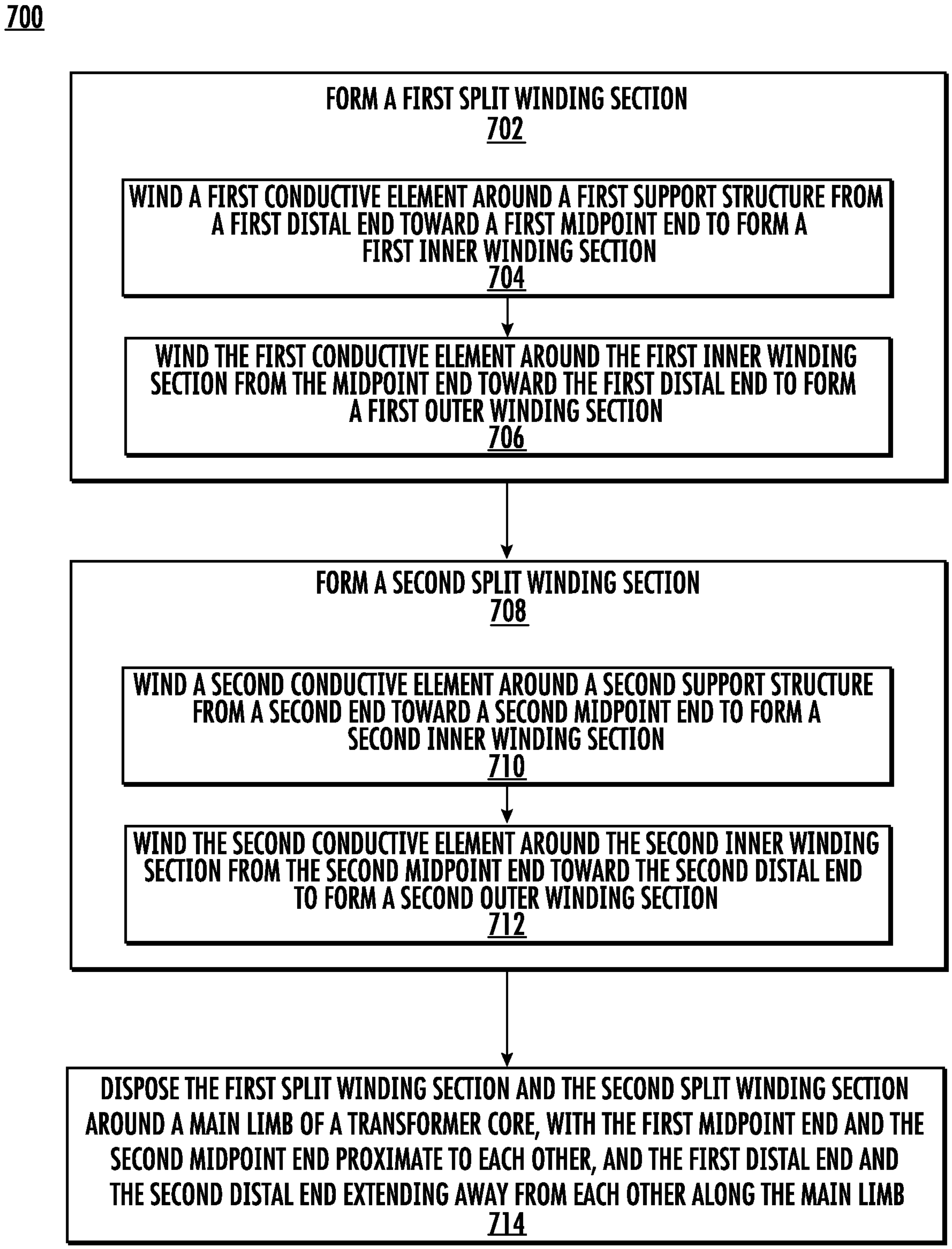
FIG. 7 is a flowchart diagram illustrating operations for forming a split winding assembly for a transformer, according to some embodiments.

FIG. 7 is a flowchart diagram illustrating operations 700 for forming a split winding assembly for a transformer, according to some embodiments. The operations 700 include forming a first split winding section (Block 702), which includes winding a first conductive element around a first support structure from a first distal end toward a first midpoint end to form a first inner winding section (Block 704), and winding the first conductive element around the first inner winding section from the midpoint end toward the first distal end to form a first outer winding section (Block 706), with the first inner winding section electrically connected to the first outer winding section proximate to the midpoint end.

The operations 700 further include forming a second split winding section (Block 708), which includes winding a second conductive element around a second support structure from a second end toward a second midpoint end to form a second inner winding section (Block 710), and winding the second conductive element around the second inner winding section from the second midpoint end toward the second distal end to form a second outer winding section (Block 712), with the second inner winding section electrically connected to the second outer winding section proximate to the second midpoint end.

The operations 700 further include disposing the first split winding section and the second split winding section around a main limb of a transformer core (Block 714) so that the first midpoint end and the second midpoint end are proximate to each other, and so that the first distal end and the second distal end extend away from each other along the main limb, with the first split winding section and the second split winding section being electrically insulated from each other.

In the above description of various embodiments of present disclosure, it is to be understood that the terminology used herein is for the purpose of describing particular embodiments only and is not intended to be limiting of present disclosure. Unless otherwise defined, all terms (including technical and scientific terms) used herein have the same meaning as commonly understood by one of ordinary skill in the art to which present embodiments belong. It will be further understood that terms, such as those defined in commonly used dictionaries, should be interpreted as having a meaning that is consistent with their meaning in the context of this specification and the relevant art.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of the present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the present disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present disclosure. All such variations and modifications are intended to be included herein within the scope of the present disclosure. Accordingly, the above disclosed subject matter is to be considered illustrative, and not restrictive, and the examples of embodiments are intended to cover all such modifications, enhancements, and other embodiments, which fall within the spirit and scope of the present disclosure. Thus, to the maximum extent allowed by law, the scopes of present embodiments are to be determined by the broadest permissible interpretation of the present disclosure including the examples of embodiments and their equivalents, and shall not be restricted or limited by the foregoing detailed description.

What is claimed is:

1. A split winding assembly for a transformer, the split winding assembly configured to extend along a main limb of a transformer core between a first end and a second end, the split winding assembly comprising:

- a first split winding section extending from the first end toward a midpoint of the split winding assembly along the main limb of a transformer core, the first split winding section comprising:
  - a first inner winding section configured to surround the main limb of the transformer core; and
  - a first outer winding section surrounding the first inner winding section, wherein the first inner winding section is electrically connected to the first outer winding section proximate to the midpoint of the split winding assembly; and
- a second split winding section extending from the second end toward the midpoint of the split winding assembly, the second split winding section comprising:
  - a second inner winding section configured to surround the main limb of the transformer core; and
  - a second outer winding section surrounding the second inner winding section, wherein the second inner winding section is electrically connected to the second outer winding section proximate to the midpoint of the split winding assembly,
- the first split winding section and the second split winding section being electrically insulated from each other.

2. The split winding assembly of claim 1, further comprising:

a first pair of terminals electrically connected to the first inner winding section and the first outer winding section at the first end of the split winding assembly; and a second pair of terminals electrically connected to the second inner winding section and the second outer winding section at the second end of the split winding assembly.

3. The split winding assembly of claim 1, wherein the first end and the second end of the split winding assembly define a first axis, and wherein the split winding assembly is bilaterally symmetrical with respect to an axis of symmetry that is perpendicular to the first axis.

4. The split winding assembly of claim 1, further comprising:

a cooling subassembly surrounding the first split winding section and the second split winding section, the cooling subassembly comprising:

a central duct extending between the first end and the second end of the split winding assembly, wherein the central duct is configured to surround the main limb of the transformer core so that the transformer core extends through the central duct; and a plurality of radial ducts extending radially between the central duct and an exterior of the cooling subassembly, wherein the plurality of radial ducts are in fluid communication with the central duct and the exterior of the cooling subassembly.

5. The split winding assembly of claim 4, wherein the cooling subassembly further comprises:

a plurality of axial ducts extending between the first end and the second end of the split winding assembly, wherein each axial duct is disposed between the first inner winding section and the first outer winding section of the first split winding section and between the second inner winding section and the second outer winding section of the second split winding section, wherein each axial duct of the plurality of axial ducts is in fluid communication with the first end of the split winding assembly, the second end of the split winding assembly, and at least one radial duct of the plurality of radial ducts.

6. The split-winding assembly of claim 1, wherein each of the first inner winding section, the first outer winding section, the second inner winding section, and the second outer winding section comprise one of a helical-type winding, a foil-type winding, a disc-type winding, or layer-type winding.

7. A transformer comprising:

a transformer core comprising at least one main limb; and at least one split winding subassembly extending along the at least one main limb between a first end and a second end, each split winding assembly of the at least one split winding subassembly comprising:

a first split winding section extending from the first end toward a midpoint of the split winding subassembly along the at least one main limb, the first split winding section comprising:

a first inner winding section surrounding the at least one main limb;

a first outer winding section surrounding the first inner winding section, wherein the first inner winding section is electrically connected to the first outer winding section proximate to the midpoint of the split winding subassembly; and a first pair of terminals electrically connected to the first inner winding section and the first outer winding section at the first end of the split winding subassembly; and a second split winding section extending from the second end toward the midpoint of the split winding subassembly, the second split winding section comprising:

a second inner winding section surrounding the at least one main limb;

a second outer winding section surrounding the second inner winding section, wherein the second inner winding section is electrically connected to the second outer winding section proximate to the midpoint of the split winding subassembly; and a second pair of terminals electrically connected to the second inner winding section and the second outer winding section at the second end of the split winding subassembly, the first split winding section and the second split winding section of each split winding subassembly being electrically insulated from each other, the first end and the second end of each split winding subassembly defining a first axis, and each split winding subassembly being bilaterally symmetrical with respect to an axis of symmetry that is perpendicular to the first axis of the split winding subassembly.

8. The transformer of claim 7, wherein the at least one split winding subassembly comprises a plurality of split winding subassemblies electrically connected to each other in series.

9. The transformer of claim 7, wherein the at least one split winding subassembly comprises a plurality of split winding subassemblies electrically connected to each other in parallel.

10. The transformer of claim 7, wherein each split winding subassembly further comprises:

a cooling subassembly surrounding the first split winding section and the second split winding section of the split-wiring subassembly, the cooling subassembly comprising:

a central duct extending between the first end and the second end of the split winding subassembly, wherein the central duct is configured to surround the main limb of the transformer core so that the transformer core extends through the central duct; and a plurality of radial ducts extending radially between the central duct and an exterior of the cooling subassembly, wherein the plurality of radial ducts are in fluid communication with the central duct and the exterior of the cooling subassembly.

11. The transformer of claim 10, wherein the cooling subassembly of each split winding subassembly further comprises:

a plurality of axial ducts extending between the first end and the second end of the split winding assembly, wherein each axial duct is disposed between the first inner winding section and the first outer winding section of the first split winding section and between the second inner winding section and the second outer winding section of the second split winding section, wherein each axial duct of the plurality of axial ducts is in fluid communication with the first end of the split winding assembly, the second end of the split winding assembly, and at least one radial duct of the plurality of radial ducts.

12. The transformer of claim 10, further comprising a tank surrounding the core and the at least one split winding sub-assembly, wherein the cooling subassembly of each split winding subassembly is configured to circulate a fluid through the radial ducts to cool the split winding subassembly.

13. The transformer of claim 7, wherein the at least one split winding subassembly comprises a primary winding.

14. The transformer of claim 13, wherein the at least one split winding subassembly further comprises a secondary winding disposed between the primary winding and the core.

15. The transformer of claim 7, wherein the at least one split winding subassembly comprises a secondary winding.

16. The transformer of claim 15, further comprising a primary winding comprising:

a first primary winding section surrounding the first split winding section, the first primary winding section comprising at least one first tap area; and a second primary winding section surrounding the first split winding section, the second primary winding section comprising at least one second tap area, wherein the primary winding is bilaterally symmetrical with respect to the axis of symmetry.

17. The transformer of claim 7, wherein the core comprises a single-phase core.

18. The transformer of claim 17, wherein the single-phase core comprises one of a D core, an EY core, or a DY core.

19. The transformer of claim 7, wherein the core comprises a three-phase core.

20. The transformer of claim 19, wherein the three-phase core comprises one of a T core or a TY core.

* * * * *